United States Patent Office 2,968,158
Patented Jan. 17, 1961

2,968,158

NEW BENZENE SULFONYL UREAS; COMPOSITION AND PROCESS FOR LOWERING BLOOD SUGAR THEREWITH

Heinrich Ruschig, Bad Soden, Taunus, Walter Aumüller, Gerhard Korger, Hans Wagner, and Josef Scholz, Frankfurt am Main, and Alfred Bänder, Hofheim, Taunus, Germany, assignors, by mesne assignments, to The Upjohn Company, Kalamazoo, Mich., a corporation of Delaware No Drawing. Filed July 31, 1956, Ser. No. 601,108

Claims priority, application Germany Aug. 8, 1955

15 Claims. (Cl. 167—55)

This application is a continuation-in-part application of copending application Serial No. 555,744 filed December 28, 1955, for "Benzene-sulfonyl-ureas and a process of preparing them" now abandoned.

It is known that certain compounds belonging to the class of aminobenzene sulphonamides are capable of lowering the blood sugar value in test animals, for example, of dogs. Thus, for example, para-aminobenzene-sulphonamide-isopropyl-thiodiazole produces a moderate lowering of the blood sugar value in dogs for 4 to 6 hours (compare: Jean la Barre and Jean Reuse, Arch.néerland. physiol. 28 [1947], page 475).

Other benzenesulphonylureas such as N-benzenesulphonyl-urea, N-benzenesulphonyl-N'-phenyl-urea, N-benzenesulphonyl-N':N'-diethyl-urea, N-paratoluene sulphonyl-urea and N-para-toluenesulphonyl-N'-phenyl-urea (compare: Chem. Rev., volume 50, pages 28–29) are known. However, these substances have not yet attained any commercial importance. Other products belonging to the series of sulphonylureas are disclosed in U.S. specification No. 2,390,253 and French specification No. 993,465.

The present invention provides benzenesulphonylureas of the formula

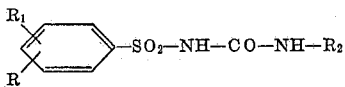

$-SO_2-NH-CO-NH-R_2$ wherein R is a member selected from the group consisting of hydrogen, alkyl and alkoxy groups having at most 6 carbon atoms, $R_1$ is a member selected from the group consisting of hydrogen, alkyl and alkoxy groups having at most 6 carbon atoms, further cycloalkyl and cycloalkylalkyl groups containing 5–8 carbon atoms, and $R_2$ is a member selected from the group consisting of alkyl-, alkenyl-, cycloalkyl- and cycloalkylalkyl radicals containing 2–8 carbon atoms and non-toxic basic salts thereof and a process for their preparation.

The radical

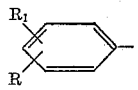

may be, for example, phenyl, methyl-phenyl, more especially para-methylphenyl, ethyl-phenyl, propyl-phenyl, butyl, pentyl-phanyl or hexyl-phenyl groups. The alkyl substituent may be unbranched or branched, and may be bound in the para-position of the phenyl radical or in other positions, in the latter case more especially in the meta-position. The radical may also be a disubstituted phenyl radical, such as dialkyl-, dialkoxy- or alkyl- alkoxy-phenyl groups. There may also be mentioned phenyl residues that contain a cycloalkyl or cycloalkylalkyl group, especially a cyclohexyl or a cyclohexyl methyl group. The substituents may be bound in any desired position to the benzene nucleus.

$R_2$ may be, for example, an alkyl group e.g. ethyl, propyl, butyl, pentyl, hexyl, an alkylene group, e.g. allyl or butylene, a cycloalkyl group e.g. cyclopentyl, cyclohexyl or cycloheptyl or cycloalkylalkyl group e.g. cyclohexylmethyl or cyclohexylethyl. Also in this case, the aliphatic residues may have straight or branched chains.

The compounds of the above formula are made by methods known for making sulphonylureas. As example the following processes may be mentioned:

A benzenesulphonyl isocyanate, which may be alkylated or alkoxylated, may be reacted with a primary butylamine or another primary alkylamine or an alkenylamine, cycloalkylamine or cycloalkyl-alkylamine containing 2–8 carbon atoms. Conversely, the desired sulphonylurea can be made by reacting a butyl isocyanate or other appropriate isocyanate with a benzene-sulphamide, which may be alkoxylated or alkoxylated, advantageously in the form of salt thereof. Instead of isocyanates there may be used compounds convertible into isocyanates in the course of the reaction, such as acid azides, for example, valeric acid azide. In another process for making the new compounds there are used instead of isocyanates, urethanes, and any desired carbamic acid ester, such as methyl, ethyl, propyl, butyl or aryl esters, can be used for this purpose. For example, a benzene sulphonyl-urethane, which may be alkylated or alkoxylated in the benzene nucleus, may be reacted, for example, with butylamine or another primary amine, or, conversely, an alkylurethane may be reacted with an appropriate benzene-sulphamide, advantageously in the form of a salt thereof. Carbamic acid halides can also be used with special advantage. Thus, for example, the new sulphonylureas are formed by reacting a butyl-carbamic acid chloride with a benzene sulphamide, which may be alkylated or alkoxylated, or by reacting a benzene sulphonylcarbamic acid chloride with a butylamine or another primary amine. In a further process a benzene sulphonylurea, which is unsubstituted in the —NH₂ group or substituted by other radicals, such as acyl and

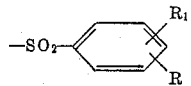

$-SO_2-$ is converted into a benzene sulphonyl-alkyl-urea by reaction with primary amines of the formula $H_2N-R_2$ for example butylation, if desired, with butylamine. Alternatively, an alkyl-urea may be reacted with a benzene-sulphamide. Instead of the alkyl-ureas there may be used the corresponding iso-urea ethers, advantageously in the form of their salts, and they are reacted with benzene sulphonic acid chlorides, and the product so obtained is then converted by acid hydrolysis into the desired sulphonylurea. Instead of the alkyl-ureas or the corresponding iso-urea ethers, other derivatives may be used.

In further processes for making the new compounds the corresponding thiourea is first prepared, and sulphur is eliminated therefrom in a conventional manner; or a corresponding N-benzene-sulphonyl-N'-alkyl-guanidine is prepared in known manner (for example, reacting a benzenesulphonyl-cyanamide with a butylamine or with another primary amine), and the resulting guanidine is then hydrolysed. In all cases there may be used, instead of the unsubstituted benzesulphonyl compound, and instead of the alkyl- or alkoxy-benzenesulphonyl compound a cycloalkyl- or cycloalkylalkyl-benzenesulphonyl compound; and, instead of butylamine, another primary alkylamine, or an alkenylamine, cycloalkylamine or cycloalkylalkylamine may be used. In these reactions the components are always to be chosen in such a manner that the radical $R_2$ contained in the reaction product contains 2-8 carbon atoms.

As alkyl or alkoxy residues, of which one or two may be present as substituents in the phenyl radical, there may be mentioned, more especially, those of low molecular weight. Especially advantageous are those containing 1 to 3 carbon atoms, but residues containing 4-6 carbon atoms may also be present. When these residues contain more than 8 carbon atoms, the activity of the products is generally considerably lower. Instead of being alkylated or alkoxylated, the benzenesulphonyl compounds may contain as substituents in the phenyl residue a cycloalkyl or cycloalkylalkyl group if desired in addition to an alkyl or alkoxy group. The processes for making the sulphonylureas described above are also suitable for making the cycloalkylated benzene sulphonyl compounds.

The primary amines used as starting materials in the above processes advantageously contain alkyl-, alkenyl-, cycloalkyl- or cycloalkylalkyl radicals containing 2 to 6 carbon atoms. However, they may likewise contain 7 and 8 carbon atoms, but radicals of higher molecular weight generally reduce the activity of the products.

The reaction conditions under which the aforesaid processes are carried out may vary within wide limits and are adapted to each particular case. For example, the reactions may be carried out with the use of solvents at room temperature or at a higher temperature. Particularly suitable are the following processes:

(1) The reaction of a compound of the formula

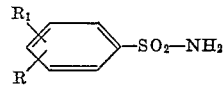

in which R and $R_1$ have the meanings given above, and advantageously in the form of a suitable alkali metal salt, with an isocyanate of the general formula $R_2$—NCO in the presence of a solvent, for example, nitrobenzene or acetone, at the ordinary or a higher temperature.

(2) The reaction of a benzene sulphonyl-carbamic acid ester of the formula

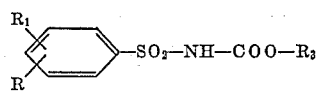

in which R and $R_1$ have the meanings given above, and $R_3$ represents any desired, preferably lower hydrocarbon residue, with an equivalent quantity of an amine of the formula $R_2$—$NH_2$. In this case it is advantageous to use as solvent a glycolmonoalkyl ether and to conduct the reaction at a temperature within the range of 100° C. to 140° C. In this reaction the ratio of the reactants to solvent may be of importance; advantageously the proportion of solvent amounts to 55-65 percent of the total quantity of the reaction mixture.

To obtain the products in as pure a state as possible, it is advantageous to separate the product thoroughly from the benzene sulphamide used as starting material or formed in the course of the reaction. Advantageously, this is carried out taking up the product in dilute ammonia (1 part by volume of ammonia to 20-30 parts by volume of water), since the sulphamides are generally sparingly soluble in this medium at room temperature.

Many of the starting materials suitable for use in the present process have been described in literature. There may be mentioned, for example, benzene-sulphamide, 4-methyl-benzene-sulphamide, 4-ethyl-benzene-sulphamide, 4 - n - propyl - benzene - sulphamide, 4 - isopropyl - benzene-sulphamide, 4-n-butyl-benzene-sulphamide, 4-iso-butyl-benzene-sulphamide, 4-methoxy-benzene-sulphamide, 4-ethoxy-benzene-sulphamide, 4-cyclo-hexyl-benzene-sulfamide, 4-cyclopentyl-benzene-sulphamide and 4-cyclohexyl-methyl-benzene-sulphamide. Examples of suitable corresponding isocyanates and carbamic acid esters are: benzene-sulphonyl isocyanate, 4-methyl-benzenesulphonyl isocyanate, 4-ethoxy-benzenesulphonyl isocyanate, 4-cyclohexylmethyl-benzenesulphonyl isocyanate, 4-methyl-benzenesulphonyl-ethyl carbamate, 4-ethoxy-benzenesulphonyl-methyl carbamate, 4-cyclohexyl-benzenesulphonyl-methyl carbamate and the like. Instead of compounds substituted in the 4-position of the benzene nucleus, there may be used the corresponding compounds substituted in the 2-position or 3-position. Further suitable starting materials are: correspondingly substituted benzenesulphonyl-urethanes containing in the urethane component a lower alkyl radical, for example, a methyl, ethyl, propyl or butyl group, and more especially an ethyl group, or an aryl radical; correspondingly substituted benzenesulphonylureas; and correspondingly substituted benzene sulphonic acid halides.

There may also be used as starting materials, for example, dimethyl benzenesulphonyl compounds in the form of the chlorides, amides, isocyanates, carbamic acid halides, carbamic acid esters or ureas, or the corresponding dimethoxy-benzenesulphonyl compounds or methoxymethyl-benzenesulphonyl derivatives. Instead of the methyl group, an ethyl, propyl, butyl or a higher alkyl group having up to 6 carbon atoms may be present.

As starting materials there may also be mentioned: cycloalkyl- or cycloalkylalkyl-benzene-sulphonylamides or -sulphonyl isocyanates containing, for example, cyclohexyl-, cyclopentyl, cyclohexylmethyl-, cyclohexylethyl, further cycloalkyl- or cycloalkylalkyl substituents in addition to alkyl- or alkoxy substituents in the benzene nucleus, for example 4-cyclohexyl-3-methyl-benzenesulphonylamides, 4-cyclohexylmethyl-2-methoxy-benzenesulphonyl-amides and the corresponding-sulphonyl isocyanates, sulphonyl urethanes, sulphonylureas; and correspondingly substituted sulphonic acid halides.

For the reaction with the compounds mentioned above there may be used the following primary amines: As alkylamines there may be mentioned, for example, ethylamine, n-propylamine, isopropylamine, n-butylamine, iso-butylamine, secondary butylamine, tertiary butylamine, pentylamine-(1), pentylamine-(2), pentylamine-(3), 3-methyl-butylamine-(1), 2-methyl-butylamine-(1), 2:2-dimethyl-propylamine-(1), 3-methyl-butylamine-(2), hexylamines such as hexylamine-(1) and 2-methyl-pentylamine-(1), heptylamines such as heptylamine-(1) and heptylamine-(4), and octylamines such as octylamine-(1).

There may be mentioned as examples of alkenylamines, allylamine and crotylamine; as cycloalkylamines, cyclohexylamine and cyclopentylamine; and as cycloalkylalkylamines, cyclohexylmethylamine and cyclohexylethylamine.

Instead of using the aforementioned amines, the corresponding isocyanates, urethanes, carbamic acid halides, ureas or isourea ethers (obtainable from the aforesaid amines) may be reacted with suitably substituted benzene sulphonamides or halides.

When the synthesis of the desired sulphonylurea starts from a corresponding thiourea, for example, from N-4-methyl- or N-4-methoxy - benzenesulphonyl - N′ - alkyl-, alkenyl-, -cycloalkyl- or -cycloalkylalkyl-thio-ureas containing 2-8 carbon atoms, the sulphur may be eliminated with a heavy metal oxide or a salt thereof, for example, an oxide or salt of lead, copper or silver, in an aqueous or alcoholic solution.

Alternatively, the desired sulphonylurea can be prepared by hydrolysing an appropriately constituted guanidine with a dilute acid or alkaline solution.

As has been demonstrated by experiments on animals and in clinical tests, the products of the invention produce a substantial lowering of the blood sugar level. They may be used as such or in the form of their salts, or in the presence of substances that cause salt formation. For salt formation there may be used, for example, ammonia, an alkaline substance such as an alkali metal or alkaline earth metal hydroxide, an alkali metal carbonate or bicarbonate, or a physiologically tolerated organic base. These salts possess the same properties of reducing the blood sugar value. It is supposed that the compounds in the intestine of human beings are converted by alkaline reaction into their salts and are resorbed as such. The compounds can be made up, inter alia, into preparations suitable for oral administration and lowering the blood sugar in the treatment of diabetes.

The preparations suitable for oral administration as tablets or dragées may be prepared, for example, in a manner such that the below mentioned ingredients are mixed homogeneously, if desired granulated while moist, dried and then pressed.

0.5 g. of a compound of the formula

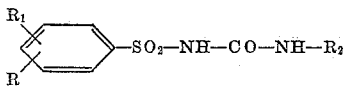

wherein R represents a hydrogen atom, alkyl and alkoxy radicals having at most 6 carbon atoms, $R_1$ represents a hydrogen atom, alkyl and alkoxy radicals having at most 6 carbon atoms and cycloalkyl and cycloalkylalkyl radicals containing 5–8 carbon atoms, and $R_2$ represents an alkyl, alkenyl, cycloalkyl or cycloalkylalkyl radical having 2–8 carbon atoms, 0.1395 g. of wheat starch or corn starch
0.0075 g. of talcum
0.0030 g. of magnesium stearate.

Further objects of the present application are therefore: Pharmaceutical preparations containing a compound of the formula

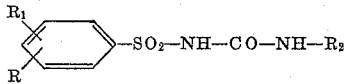

wherein R represents a hydrogen atom, alkyl and alkoxy radicals having at most 6 carbon atoms, $R_1$ represents a hydrogen atom, alkyl and alkoxy radicals having at most 6 carbon atoms and cycloalkyl and cycloalkylalkyl radicals containing 5–8 carbon atoms, and $R_2$ represents an alkyl, alkenyl, cycloalkyl or cycloalkylalkyl radical having 2–8 carbon atoms, and carriers, diluents and/or other products applied for the manufacture of pharmaceutical preparations.

Pharmaceutical preparations containing a compound of the formula

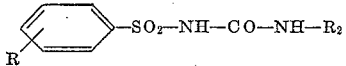

wherein R represents an alkyl group having at most 6 carbon atoms, and $R_2$ means an alkyl radical containing 2–8 carbon atoms, and carriers, diluents and/or other products applied for the manufacture of pharmaceutical preparations.

Pharmaceutical preparations containing a compound of the formula

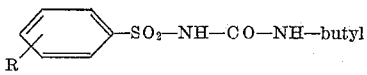

wherein R represents an alkyl group having at most 4 carbon atoms, and carriers, diluents and/or other products applied for the manufacture of pharmaceutical preparations.

Pharmaceutical preparations containing a compound of the formula

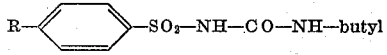

wherein R represents an alkyl group having at most 6 carbon atoms, and carriers, diluents and/or other products applied for the manufacture of pharmaceutical preparations.

Pharmaceutical preparations containing a compound of the formula

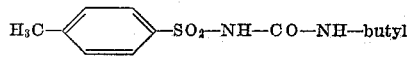

and carriers, diluents and/or other products applied for the manufacture of pharmaceutical preparations.

In animal tests the action on the blood sugar level has been demonstrated, for example, on mice, rats, guinea pigs, rabbits, cats and dogs. When, for instance, a compound of the invention is administered to normally fed rabbits in a single average dose of 400 mg./kg. in, for example, a solution rendered alkaline with bicarbonate, or in the form of an alkali metal salt, a lowering of the blood sugar level sets in rapidly and reaches a maximum (about 30 to 40 percent of the initial value) in the course of about 3 to 4 hours.

The blood sugar level can be measured by hourly analyses by the method of Hagedorn-Jensen. The lowering of the blood sugar is determined by comparison with the blood-sugar level of control animals fed in the same way but not so treated.

The activity of the products of the invention is shown in the following table:

TABLE I

| Substance (in the form of the sodium salt) | maximum lowering of blood sugar in the rabbit; dose: 400 mg./kg. per os |
|---|---|
| | Percent |
| N-(4-methyl-benzenesulphonyl)-N'-n-butyl-urea | 45 |
| N-(4-n-propyl-benzenesulphonyl)-N'-n-butyl-urea | 30 |
| N-(4-methoxy-benzenesulphonyl)-N'-isobutyl-urea | 30 |
| N-(3-methyl-benzenesulphonyl)-N'-n-butyl-urea | 40 |
| N-benzenesulphonyl-N'-isobutyl-urea | 40 |
| N-(4-methyl-benzenesulphonyl)-N'-tertiary-butyl-urea | 30 |
| N-(4-ethyl-benzenesulphonyl)-N'-cyclohexyl-urea | 30 |
| N-(4-methyl-benzenesulphonyl)-N'-n-propyl-urea | 40 |
| N-(4-methyl-benzenesulphonyl)-N'-hexyl-urea | 33 |
| N-(4-methyl-benzenesulphonyl)-N'-allyl-urea | 45 |
| N-(4-ethyl-benzenesulphonyl)-N'-isobutyl-urea | 30 |
| N-(4-isopropyl-benzenesulphonyl)-N'-n-butyl-urea | 40 |
| N-(4-methyl-benzenesulphonyl)-N'-sec-butyl-urea | 30 |
| N-(4-methyl-benzenesulphonyl)-N'-isopropyl-urea | 40 |
| N-(4-methyl-benzenesulphonyl)-N'-n-amyl-urea | 30 |
| N-(3-methyl-benzenesulphonyl)-N'-isobutyl-urea | 30 |
| N-(4-cyclohexyl-benzenesulphonyl)-N'-isobutyl-urea | 30 |
| N-(4-methoxy-3-methyl-benzenesulphonyl)-N'-cyclohexylmethyl-urea | 40 |
| N-(3.4-dimethoxy-benzenesulphonyl)-N'-isobutyl-urea | 30 |
| N-benzenesulphonyl-N'-cyclohexyl-urea | 35 |
| N-(3-isopropyl-benzenesulphonyl)-N'-n-hexyl-urea | 25 |
| N-(3-methyl-benzenesulphonyl)-N'-cyclohexyl-urea | 50 |
| N-(3.4-dimethoxy-benzenesulphonyl)-N'-hexyl-urea | 50 |
| N-(2.4-dimethylbenzenesulphonyl)-N'-cyclohexyl-urea | 30 |
| N-(4-n-butoxy-benzenesulphonyl)-N'-n-butyl-urea | 30 |
| N-(4-n-hexyl-benzenesulphonyl)-N'-isobutyl-urea | 30 |
| N-(4-n-butyl-benzenesulphonyl)-N'-isobutyl-urea | 40 |
| N-[4-(pentyl-3)-benzenesulphonyl]-N'-iso-butyl-urea | 35 |
| N-(4-n-butoxy-benzenesulphonyl)-N'-cyclohexyl-urea | 35 |
| N-[4-(pentyl-3)-benzenesulphonyl]-N'-cyclohexyl-urea | 30 |

The testing of the compounds on dogs has the advantage that the resorption conditions in the alimentary canal are similar to those of human beings, and that the blood sugar level exhibits smaller individual variations than in rabbits. In the canine tests the administration of small doses even of the free sulphonylureas yields readily reproducible values. When the compound to be tested is administered to a dog, prior to feeding it, in a single dose of 100 mg./kg., and the blood sugar level is determined at certain intervals, the reductions in the blood sugar level shown in the following table are observed:

TABLE II

| Substance | Lowering of blood sugar level of the dog | |
|---|---|---|
| | Percent | After—hours |
| N-(4-methyl-benzenesulphonyl)-N'-n-butyl-urea | 30 | 1 |
| | 30 | 24 |
| | 22 | 48 |
| | 0 | 72–96 |
| N-(4-methyl-benzenesulphonyl)-N'-isobutyl-urea | 47 | 1 |
| | 47 | 24 |
| | 20 | 48 |
| | 10 | 72 |
| | 0 | 96 |
| N-benzenesulphonyl-N'-n-butyl-urea | 25 | 1 |
| | 25 | 24 |
| | 16 | 48 |
| | 0 | 72 |
| N-(4-ethyl-benzenesulphonly)-N'-n-butyl-urea | 25 | 1 |
| | 30 | 2 |
| | 33 | 3 |
| | 27 | 24 |
| | 0 | 48 |
| N-(4-methoxy-benzenesulphonyl)-N'-n-butyl-urea | 20 | 2 |
| | 4 | 24 |
| | 0 | 48 |
| N-(3-methyl-benzenesulphonyl)-N'-isobutyl-urea | 48 | 3 |
| | 30 | 6 |
| | 14 | 24 |
| | 0 | 48 |
| N-(4-methyl-benzenesulphonyl)-N'-cyclohexyl-urea. | 39 | 1 |
| | 43 | 24 |
| | 10 | 48 |
| | 0 | 72 |
| N-(4-methyl-benzenesulphonyl)-N'-allyl-urea | 32 | 1 |
| | 34 | 2 |
| | 34 | 24 |
| | 10 | 48 |
| | 0 | 72 |
| N-(4-methyl-benzenesulphonyl)-N'-cyclopentyl-urea. | 40 | 1 |
| | 40 | 24 |
| | 25 | 48 |
| | 0 | 72 |
| N-(4-methyl-benzenesulphonyl)-N'-hexyl-urea | 30 | 1 |
| | 35 | 6 |
| | 16 | 24 |
| | 10 | 72 |
| | 0 | 96 |
| N-(3-methyl-benzenesulphonyl)-N'-n-butyl-urea | 25 | 2 |
| | 30 | 3 |
| | 30 | 6 |
| | 25 | 24 |
| | 15 | 48 |
| | 0 | 72 |
| N-(4-methyl-benzenesulphonyl)-N'-tert.-butyl-urea. | 35 | 2 |
| | 30 | 6 |
| | 0 | 24 |
| N-(4-isopropyl-benzenesulphonyl)-N'-n-butyl-urea | 40 | 2 |
| | 30 | 24 |
| | 15 | 48 |
| | 0 | 72 |
| N-(4-methyl-benzenesulphonyl)-N'-ethyl-urea | 30 | 3 |
| | 38 | 5 |
| | 20 | 24 |
| | 0 | 48 |
| N-(4-ethyl-benzenesulfonyl)-N'-cyclohexyl-urea | 25 | 3 |
| | 20 | 24 |
| | 15 | 48 |
| | 10 | 72 |
| | 0 | 96 |
| N-(4-n-propyl-benzenesulphonyl)-N'-n-butyl-urea. | 49 | 6 |
| | 40 | 24 |
| | 8 | 48 |
| | 0 | 72 |

The above values were determined by comparison with the blood sugar levels measured on similarly fed, but untreated control animals. It has also been found that even a single dose, for example, of N-(4-methyl-benzene-sulphonyl)-N'-n-butyl-urea of 5 mg./kg. produced a decrease of 30% in the blood sugar level for 48 hours.

Clinical tests performed on a large number of patients have fully established the efficacy of the products of the present invention, for example, N-(4-methyl-benzene-sulphonyl)-N'-(n-butyl)-urea and N-(4-methyl-benzene-sulphonyl)-N'-isobutyl-urea, in lowering the blood sugar level. For example, the first named compound lowers the blood sugar level of healthy human beings by an average of 20–40 mg./percent. In the case of certain diabetics a lowering, for example, of about 300 mg./percent to the normal value of about 120 mg./percent has been observed. The products of the invention have been tested as antidiabetics in light and severe cases of diabetes mellitus. In many cases an impressive improvement in the metabolism was observed, more especially in sthenic adipose patients of advanced age. High glycosuriae and hyperglycaemiae have been normalised to a far-reaching extent, and the patients were freed from troublesome polydypsia and polyuria. In some cases the products develop their action on the very first day, and in general between the 2nd and 5th day. The reduced glycosuria is invariably accompanied by a distinct lowering of the blood sugar level. The renal threshold for glucose is not raised. During the administration of the compounds the usual diabetes diet must be strictly observed. Observations so far made show that the compounds are effective in most, but not in all forms of diabetes.

With some patients successfully treated for a prolonged period with the compounds of the invention the metabolism remains compensated for some time after the compounds have ceased to be administered and can be re-established, if necessary, by renewed administration. So far no insulin-resistance has been observed. The patients can be changed over to insulin treatment at any stage after treatment with the compounds of the invention. The blood count, function of the liver and the urine of the patients treated were carefully checked and displayed no pathological changes. The patients can also be treated with a combination of the products of the invention and insulin, whereby a saving in insulin and an improvement of the metabolism are achieved. In these cases the patients must be treated under particularly strict supervision, because the combined effects involve an increased risk of insulin shock. In clinical tests, the other compounds of the invention exhibited an efficacy, which is comparable with that of the N-(4-methyl-benzene-sulphonyl)-N'-(n-butyl)-urea.

The compounds of the invention may be administered in accordance with the following guiding principles, in which N-(4-methyl-benzenesulphonyl)-N'-(n-butyl)-urea is used as an example.

To produce rapidly a sufficiently high blood sugar level, 2–3 grams of this compound are administered on the first day with careful checks of the metabolism. On the second day the dose is reduced to 1.5–2 grams, and on the following days 1 to 1.5 gram each are administered. In some cases the dose can be further reduced or entirely dispensed with, while keeping constant check on the sugar in the blood and in the urine. Owing to the protracted action of the compound the daily dose can be administered all at once. Higher doses do not as a rule produce an increased action.

The compounds of the invention are usually extremely well tolerated. Their acute toxicity (tested on mice or rats), as can be seen from the following table, is between 1 and several gram/kg. at an $LD_{50}$, for oral administration:

TABLE III

| Substance | $LD_{50}$, in gram/kg. of body weight, administered orally to mice |
|---|---|
| | Grams |
| N-(3-methyl-benzenesulphonyl)-N'-isobutyl-urea | 4.5 |
| N-(4-methyl-benzenesulphonyl)-N'-n-butyl-urea | [1] 2.5 |
| N-(4-methyl-benzenesulphonyl)-N'-isobutyl-urea | 4 |
| N-(4-methyl-benzenesulphonyl)-N-tertiary-butyl-urea | 6 |
| N-(4-methyl-benzenesulphonyl)-N'-propyl-urea | 5 |
| N-(4-methyl-benzenesulphonyl)-N'-hexyl-urea | 6 |
| N-(4-methyl-benzenesulphonyl)-N'-cyclohexyl-urea | 4.8 |
| N-(4-n-propyl-benzenesulphonyl)-N'-n-butyl-urea | 4.5 |
| N-(4-isopropyl-benzenesulphonyl)-N'-n-butyl-urea | 5 |
| N-(4-methyl-benzenesulphonyl)-N'-ethyl-urea | 4.5 |
| N-(4-ethyl-benzenesulphonyl)-N'-cyclohexyl-urea | >10 |
| N-(4-ethyl-benzenesulphonyl)-N'-isobutyl-urea | 4.0 |
| N-(3-methyl-benzenesulphonyl)-N'-n-butyl-urea | 2.7 |
| N-(4-methyl-benzenesulphonyl)-N'-n-propyl-urea | 4.5 |
| N-(4-methyl-benzenesulphonyl)-N'-isopropyl-urea | 3.0 |
| N-(4-methyl-benzenesulphonyl)-N'-cyclopentyl-urea | >6 |
| N-(4-methyl-benzenesulphonyl)-N'-cyclohexyl-methyl-urea | 4.5 |

[1] Rats, 4 grams.

Tests conducted with N-(4-methyl-benzenesulphonyl)-N'-n-butyl-urea, marked S$^{35}$, have shown that the blood very rapidly absorbs the compounds from the alimentary canal. Their discharge into the urine also occurs relatively rapidly and almost quantitatively. No detectable amounts accumulate in particular organs, and the good tolerance of the compounds can be attributed to this fact. Thorough pharmacological investigations, more especially with respect to muscle and liver glycogen, have shown that the lowering of the blood sugar by the compounds of the invention is not the symptom of a toxic action. Moreover, the tolerance in the endurance test, as has been demonstrated on animals by administration over a period of several months of a daily dose of 100 mg./kg., for example, of N-(4-methyl-benzenesulphonyl)-N'-n-butyl-urea, is very high.

Extensive clinical tests performed on numerous patients have demonstrated the good tolerance of the compounds, for example, N-(4-methyl-benzenesulphonyl)-N'-n-butyl-urea and of N-(4-methyl-benzenesulphonyl)-N'-isobutyl-urea.

As compared with compounds of similar constitution of the sulphanilyl series the compounds of the present invention are distinguished, on one hand, in that they are more resistant to external oxidising influences, such as atmospheric oxygen, which is of importance to their shelf-life and handling, and, on the other, in that they have no bacteriostatic action.

Furthermore, the new compounds do not produce the secondary effects of sulphonamides on the blood (Heinz bodies) or on the thyroid gland, nor the digestive disturbances caused by action on the bacterial flora of the alimentary tract. The following examples illustrate the invention, but they are not intended to limit it thereto:

*Example 1.—N-4-methyl-benzenesulphonyl-N'-n-butyl-urea*

50 grams of n-butyl isocyanate are stirred at room temperature into a suspension of 96 grams of sodium 4-methyl-benzenesulphamide in 120 cc. of dry nitrobenzene, and the whole is then heated for 7 hours at 100° C. After being cooled, the reaction mixture, which is a thick magma, is diluted with methylene chloride or ethyl acetate, and the sodium salt of the sulphonylurea formed is separated by centrifuging. The centrifuged crystalline residue freed from organic solvents is dissolved in 500–600 cc. of water heated at 50° C., and decolorised with animal charcoal. The precipitate obtained by acidification with dilute hydrochloric acid is dissolved in an equivalent quantity of dilute ammonia solution (about 1:20), again treated with animal charcoal and reprecipitated with dilute hydrochloric acid. In this manner N-4-methyl-benzenesulphonyl-N'-n-butyl-urea is obtained in analytically pure form in a yield of 70–80 percent of theory. It melts at 125–127° C. (with decomposition).

By reacting another 4-alkylbenzene-sulphamide or an alkali metal salt thereof, for example, the sodium salts of 4-ethyl-, 4-n-propyl, 4-isopropyl- or 4-n-butyl-benzene-sulphonamide, or a 4-alkoxybenzene-sulphonamide such as 4-ethoxy-benzene-sulphamide, with n-butyl isocyanate there are obtained in the same manner the analogues of N-4-methyl-benzenesulphonyl-N'-n-butyl-urea. The yields and properties of these compounds are similar.

By reacting 2-methyl-benzene-sulphamide in similar manner with n-butyl isocyanate N-2-methyl-benzenesulphonyl-N'-n-butyl-urea is obtained melting at 160–161° C. Instead of 2-methyl-benzene-sulphamide there may be used other benzene-sulphamides substituted by lower alkyl or alkoxy groups.

100 grams of N-4-methyl-benzenesulphonyl-N'-n-butyl-urea are dissolved with slight heating in 370 cc. of a 1 N-solution of sodium hydroxide, and the clear colourless solution (pH=8.5–9.5) is evaporated at 50–60° C. under reduced pressure. The residue, which at first is only partially solid, crystallises completely after being allowed to stand for some time. It is triturated with acetone, filtered off with suction, washed with acetone, and dried at 100° C. Yield: 90–100 grams of the sodium salt of N-4-methyl-benzenesulphonyl-N'-n-butyl-urea (83–92 percent of theory). It melts at 130–133° C. On cooling an aqueous solution thereof of 20% strength, the sodium salt of N-4-methyl-benzenesulphonyl-N'-n-butyl-urea crystallises out as the tetrahydrate. It melts at 41–43° C.

*Example 2.—N-benzenesulphonyl-N'-n-butyl-urea*

63 grams of benzene-sulphamide, 120 grams of finely ground potassium carbonate and 600 cc. of dry acetone are stirred for 1 hour at 56° C. While refluxing and stirring the mixture, 40 grams of n-butyl isocyanate are then slowly added dropwise. The mixture is heated for 6 hours at 50–55° C., the acetone is completely evaporated, the residue is dissolved in water, and the solution is treated with animal charcoal and acidified with dilute hydrochloric acid. The sulphonylurea, which even at this stage is in a state of high purity, is dissolved in an equivalent quantity of dilute ammonia solution (about 1:20), again treated with animal charcoal, and precipitated with dilute hydrochloric acid. In this manner N-benzenesulphonyl-N'-n-butyl-urea is obtained in analytically pure state and in a yield of 70 to 80% of theory. It melts at 129–131° C.

In analogous manner N-benzenesulphonyl-N'-isobutyl-urea, melting at 132–133° C., is obtained from benzene-sulphamide and isobutyl isocyanate.

*Example 3.—N-4-methyl-benzenesulphonyl-N'-n-butyl-urea*

60 grams of 4-methyl-benzenesulphonyl-isocyanate are dissolved in 30 cc. of absolute anhydrous dioxane, and 22 grams of n-butylamine dissolved in 30 cc. of dioxane are slowly added dropwise, while stirring, at room temperature. When the addition is complete, the mixture is stirred for 1 hour at 80° C., a part of the dioxane is evaporated, and the sulphonylurea is precipitated by adding water. By dissolving the product in dilute ammonia solution, treating the solution with animal charcoal and precipitation with dilute hydrochloric acid, there is obtained a good yield of N-4-methyl-benzenesulphonyl-N'-n-butyl-urea melting at 125–127° C.

*Example 4.—N-4-methyl-benzenesulphonyl-N'-n-butyl-urea*

97 grams of N-4-methyl-benzenesulphonyl-carbamic acid ethyl ester melting at 84–85° C. (prepared by reacting 4-methyl-benzene-sulphamide with chloroformic acid ethyl ester in the presence of potassium carbonate) are dissolved in 130 cc. of glycol monomethyl ether, 29 grams of n-butylamine are added to the solution, and the reaction mixture is refluxed for 20 hours. The residue, obtained after distilling off the glycol monomethyl ether, is caused to crystallise by trituration with water, filtered off with suction, dissolved in dilute ammonia solution (1:20), and the solution is decolorised with animal charcoal, and the sulphonylurea is precipitated by acidifying the solution with dilute hydrochloric acid. By recrystallization from ethanol of 50° strength a good yield of N-4-methyl-benzenesulphonyl-N'-n-butyl-urea is obtained in analytically pure form. It melts at 125–127° C.

*Example 5.—N-4-ethyl-benzenesulphonyl-N'-n-butyl-urea*

56 grams of 4-ethyl-benzene-sulphamide (melting at 110° C.) are suspended in 100 cc. of acetone and dissolved by the addition of 200 cc. of an aqueous solution of 12 grams of sodium hydroxide. While stirring and cooling the mixture to about 10° C., 33 grams of n-butyl isocyanate are added dropwise and, when the addition is completed, the mixture is stirred for a further hour. The whole is diluted with water, a small amount of undissolved matter is filtered off with suction, the clear filtrate is filtered with suction through a layer of carbon and slowly acidified, while being stirred, with 2N-hydrochloric acid to a pH value of 3. At first the precipitate is obtained in a semi-solid form, but it soon becomes crystalline. It is filtered off with suction, the crude product is thoroughly washed with water, taken up in dilute ammonia solution (1:25), the solution is treated with animal charcoal and acidified with 2 N-hydrochloric acid, while being stirred. The precipitated pure white sulphonylurea is filtered off with suction, washed with water and recrystallised from ethanol of 70% strength. A good yield of N-4-ethyl-benzenesulphonyl - N' - n - butyl-urea melting at 100–102° C. is obtained.

In analogous manner there is obtained by reacting 4-ethyl-benzene-sulphamide (melting at 110° C.) in the form of its sodium salt with isobutyl isocyanate, N-4-ethyl-benzene-sulphonyl-N'-isobutyl-urea melting at 144–146° C.

*Example 6.—N-4-n-propyl-benzenesulphonyl-N'-n-butyl-urea*

By reacting 4-n-propyl-benzene-sulphamide (melting at 108–110° C.) in the form of its sodium salt with n-butyl isocyanate in acetone of 30% strength in the manner described in Example 5, a good yield of N-4-n-propyl-benzenesulphonyl-N'-n-butyl-urea melting at 104–105° C. is obtained.

In analogous manner there is obtained from the sodium salt of 4-isopropyl-benzenesulphonamide and n-butyl isocyanate, N-4-isopropyl-benzenesulphonyl-N'-n-butyl-urea melting at 135–137° C.

*Example 7.—N-4-methoxy-benzenesulphonyl-N'-n-butyl-urea*

72 grams of 4-methoxy-benzene-sulphamide, 120 grams of finely ground potassium charbonate and 800 cc. of acetone are stirred for 1 hour at 50–60° C. 40 grams of n-butyl isocyanate are then slowly added dropwise, while refluxing and stirring, the reaction mixture is heated for a further six hours at 50–55° C., and the acetone is completely evaporated. The residue is dissolved in water, treated with animal charcoal and acidified with dilute hydrochloric acid. The sulphonylurea that precipitates is at first semi-solid, but after being allowed to stand for several hours at 0° C. it becomes crystalline. It is filtered off with suction, re-precipitated from dilute ammonia solution and finally recrystallised from ethanol of 30% strength. Yield: 70 to 75% of theory. It melts at 118–119° C.

*Example 8.—N-4-methyl-benzenesulphonyl-N'-isobutyl-urea*

62.0 grams of N-4-methyl-benzenesulphonyl-carbamic acid ethyl ester are reacted as described in Example 4 with 20.5 grams of isobutylamine in glycol monomethyl ether as solvent. The resulting reaction mixture is worked up as described in Example 4. A good yield of N-4-methyl-benzenesulphonyl-N'-isobutyl-urea, melting at 169–170° C., is obtained.

To prepare the sodium salt of N-4-methyl-benzenesulphonyl-N'-isobutyl-urea, 30 grams of this compound are shaken with 160 cc. of an aqueous solution of 4 grams of sodium hydroxide for several minutes, the solution is filtered and evaporated under reduced pressure. A good yield of a crystalline magma of the sodium salt of N-4-methyl-benzenesulphonyl-N'-isobutyl-urea is obtained which is filtered off with suction and washed on the filter with acetone. The dried compound melts at 199-200° C.

The potassium salt of N-4-methyl-benzenesulphonyl-N'-isobutyl-urea, prepared in analogous manner, melts at 200–201° C. Solutions of the two salts in water are not coloured by phenol-phthalein.

The ammonium salt of N-4-methyl-benzenesulphonyl-N'-isobutyl-urea crystallises from a solution of the compound in an excess of a concentrated ammonia solution after standing for some time.

*Example 9.—N-4-methyl-benzenesulphonyl-N'-secondary-butyl-urea*

A solution of 55 grams of N-4-methyl-benzenesulphonyl carbamic acid methyl ester, 115 grams of glycol monomethyl ether and 20 grams of secondary-butylamine is refluxed at the boil for 4½ hours. The whole is then evaporated in vacuo, water is added to the residue while still warm, and it is then dissolved by adding a concentrated aqueous solution of ammonia. The solution is clarified with carbon and, while being stirred, is mixed with hydrochloric acid until the reaction is acid to Congo. A crystalline precipitation of N-4-methyl-benzenesulphonyl-N'-secondary-butyl-urea is obtained. The substance is purified by being dissolved in ammonia solution (1:20) and reprecipitated with dilute hydrochloric acid. Yield: 48 grams. After being recrystallised from aqueous ethanol, the compound melts at 128–130° C.

*Example 10.—N-4-methoxy-benzenesulphonyl-N'-isobutyl urea*

38 grams of 4-methoxy-benzene-sulphamide, 60 grams of finely ground potassium carbonate and 400 cc. of acetone are stirred for 1 hour at 50–55° C., 22 grams of isobutyl isocyanate are then slowly added dropwise, while stirring under reflux. The mixture is heated for 4 hours at 50° C., the acetone is completely evaporated, the residue is dissolved in water, treated with animal charcoal and acidified with 2 N-hydrochloric acid. The precipitated sulphonyl-urea is taken up in dilute ammonia solution (1:25), treated with animal charcoal and reprecipitated with dilute hydrochloric acid. Recrystallisation from 400 cc. of 50% ethanol gives a yield of 50 grams (87% of theory) of N-4-methoxy-benzenesulphonyl-N'-isobutyl-urea. It melts at 141–142° C.

*Example 11.—N-3-methyl-benzenesulphonyl-N'-isobutyl-urea*

85.5 grams of 3-methyl-benzene-sulphamide are suspended in 167 cc. of acetone, and 333 cc. of an aqeous solution of 20 grams of sodium hydroxide are added. 50 grams of isobutyl isocyanate are slowly added dropwise at 10° C., any crystallisation of the sodium salt of toluenesulphamide being immaterial. The whole is stirred for 1–2 hours, filtered through animal charcoal, and the filtrate is acidified, while being stirred, with dilute hydrochloric acid. A good yield of crystalline N-3-methyl-benzenesulphonyl-N'-isobutyl-urea is obtained. For purification it is dissolved in 1 litre of dilute ammonia solution (1:20) and reprecipitated with hydrochloric acid. The resulting product is recrystallised from isopropanol and melts at 105–106° C.

From 3-methyl-benzene-sulphamide and n-butyl isocyanate there is obtained in similar manner N-3-methyl-benzenesulphonyl-N'-n-butyl-urea melting at 108–109° C.

*Example 12.—N-4-methyl-benzenesulphonyl-N'-tertiary-butyl-urea*

65.7 grams of 4-methyl-benzenesulphonyl-isocyanate are dissolved in 500 cc. of benzene. While stirring continuously, 24.3 grams of tertiary butylamine are slowly added dropwise. The temperature rises to about 40° C. The solution is then refluxed at the boil for 1 hour and subsequently evaporated. The residue is treated with dilute ammonia solution (1:20), whereby dissolution is almost complete. The solution is filtered, if desired, with the addition of animal charcoal, and slow acidification with dilute hydrochloric acid produces a good yield of crystalline N-4-methyl-benzenesulphonyl-N'-tertiary-butyl-urea. After being filtered off with suction, washed with water and dried, it melts at 166–167° C. After recrystallisation from methanol the product melts at 167–168° C.

Example 13.—N-4-methyl-benzenesulphonyl-N'-isobutyl-urea 5 grams of N-4-methyl-benzenesulphonyl-carbamic acid chloride (prepared by passing dry hydrogen chloride into 4-methyl-benzene-sulphonyl isocyanate; and melting at 95–96° C. with decomposition) are added, while cooling, to an excess of isobutylamine. The reaction product is diluted with water, a small amount of flocculent matter is filtered off, and glacial acetic acid is added to the filtrate to give an acid reaction. A very good yield of crystalline N-4-methyl-benzenesulphonyl-N'-isobutyl-urea, melting at 169–170° C., is obtained.

Example 14.—N-4-methyl-benzenesulphonyl-N'-cyclohexyl-urea 33 grams of cyclohexylamine and 81 grams of N-4-methyl-benzenesulphonyl-urethane, melting at 84–85° C. (prepared by reacting 4-methyl-benzenesulphonamide with chloroformic acid ethyl ester in the presence of potassium carbonate) are heated in 150 cc. of methyl-glycol for 18 hours at 110° C. The warm reaction mixture is stirred into a solution of sodium carbonate and then cooled. The undissolved matter is filtered off with suction, and the cold mother liquor is cautiously acidified. The resulting precipitate is dissolved in dilute ammonia solution, filtered and reprecipitated with acetic acid. A good yield of N-4-methylbenzenesulphonyl-N'-cyclohexyl-urea is obtained. It is filtered off with suction, thoroughly washed with water, dissolved in hot ethanol, and precipitated by adding water. It melts at 170° C.

Example 15.—N-4-methyl-benzenesulphonyl-N'-cyclohexyl-urea 17.1 grams of para-toluenesulphamide and 30 grams of finely ground potassium carbonate are suspended in 250 cc. of dry acetone, and the whole is thoroughly stirred for 1 hour under reflux. 12.5 grams of cyclohexyl isocyanate are slowly stirred dropwise into the reaction mixture. After refluxing for 6 hours, the acetone is distilled off, and the residue is dissolved in water. The undissolved matter is filtered off with suction, and the filtrate is cautiously acidified with hydrochloric acid. The N-4-methyl-benzenesulphonyl-N'-cyclohexyl-urea so obtained very pure and in good yield, is further purified as described in Example 14 by reprecipitation from dilute ammonia solution and then recrystallised from a mixture of ethanol and water. It melts at 170° C.

Example 16.—N-4-ethyl-benzenesulphonyl-N'-cyclohexyl-urea 40 grams of 4-ethyl-benzenesulphamide (M.P. 110° C.) are suspended in 150 cc. of acetone and dissolved with 105 cc. of a 2 N-solution of sodium hydroxide. While stirring, 32 grams of cyclohexyl isocyanate are added dropwise in the course of 30 minutes at about 10° C., and, when the addition is complete, the mixture is stirred for 2½ hours. The reaction mixture is diluted with 2 liters of water and acidified with 2 N-hydrochloric acid. The precipitate so obtained is filtered off with suction and extracted twice with 2½ liters of dilute ammonia solution (1:75) on each occasion. The ammoniacal extracts are combined, filtered and acidified with 2 N-hydrochloric acid. The precipitated crude sulphonylurea is further purified by being taken up in 3 litres of dilute ammonia solution (1:75), a small amount of undissolved matter is filtered off, the filtrate is treated with animal charcoal, again filtered and acidified with 2 N-hydrochloric acid. The resulting white crystallisate is recrystallised from 800 cc. of ethanol of 50 percent strength and a good yield of N-4-ethyl-benzenesulphonyl-N'-cyclohexyl-urea is obtained. It melts at 159–160.5° C.

Example 17.—N-(3-methoxy-benzenesulphonyl)-N'-cyclohexyl-urea 11 grams of meta-methoxy-benzene-sulphonamide are suspended in 25 cc. of acetone and covered with 45 cc. of a solution of 2.3 grams of sodium hydroxide, whereby dissolution is produced. 7.3 grams of cyclohexyl isocyanate are then slowly added dropwise at 10° C. To obtain a quantitative reaction, the mixture is stirred for 1 hour. The whole is filtered, and the filtrate is acidified with dilute hydrochloric acid. The precipitated N-(3-methoxy-benzenesulphonyl)-N'-cyclohexyl-urea is filtered off with suction, dried and recrystallized from di-isopropyl ether. It melts at 140–142° C.

Example 18.—N-benzenesulphonyl-N'-cyclohexyl-urea 39.2 grams of benzensulphamide are suspended in 84 cc. of acetone. The suspension is mixed with 168 cc. of sodium hydroxide solution containing 10 grams of caustic soda and 31 grams of cyclohexyl-isocyanate are slowly added dropwise at about 10° C. to the clear solution obtained. The reaction solution is stirred for a further hour, filtered and the crude N-benzenesulphonyl-N'-cyclohexyl-urea is precipitated with dilute hydrochloric acid. After standing overnight, the urea is suctioned off, washed with water and recrystallized from methanol. A good yield of pure N-benzenesulphonyl-N'-cyclohexyl-urea is obtained. It melts at 190–192° C.

In analogous manner there is obtained with the use of 42.7 grams of meta-toluene-sulphamide and cyclohexyl-isocyanate, N-(3-methyl-benzenesulphonyl)-N'-cyclohexyl-urea melting at 141–142° C.

Example 19.—N-4-methyl-benzenesulphonyl-N'-allyl-urea 28.7 grams of N-4-methyl-benzenesulphonyl-carbamic acid methyl ester (prepared by reacting 4-methyl-benzenesulphamide with chloroformic acid methyl ester in the presence of potassium carbonate) and 7.8 grams of allylamine are refluxed for 4½ hours in 55 grams of glycol monomethyl ether. The reaction mixture is evaporated under reduced pressure, and the warm residue is mixed with water and dissolved by adding ammonia solution. The pale coloured solution is decolorised with animal charcoal, filtered and acidified, while being stirred well, with dilute hydrochloric acid until the reaction is acid to Congo. A good yield of crystalline N-4-methyl-benzenesulphonyl-N'-allyl-urea is obtained which is purified by dissolving it in dilute ammonia solution (1:20) and precipitating it with dilute hydrochloric acid. After recrystallisation from dilute ethanol the product melts at 141–143° C.

In an analogous manner there is obtained from N-4-methyl-benzenesulphonyl-carbamic acid methyl ester and n-propylamine by boiling in glycol monomethyl ether as solvent, N-4-methyl-benzenesulphonyl-N'-n-propyl-urea melting at 151–152° C.

In an analogous manner there is obtained with the use of isopropylamine, N-4-methyl-benzenesulphonyl-N'-isopropyl-urea melting at 141—143° C.

Example 20.—N-4-methyl-benzenesulphonyl-N'-allyl-urea 65.7 grams of 4-methyl-benzenesulphonyl isocyanate are dissolved in 500 cc. of benzene. While stirring, 20.9 grams of allylamine are slowly added dropwise at room temperature. The temperature rises slightly, and a good yield of N-4-methyl-benzenesulphonyl-N'-allyl-urea is obtained. It is filtered off with suction and recrystallised from dilute ethanol. It melts at 141–143° C.

Example 21.—N-4-methyl-benzenesulphonyl-N'-isoamyl-urea 51 grams of 4-methyl-benzene-sulphamide, 90 grams of finely ground potassium carbonate and 560 cc. of acetone are stirred for 1 hour at 50–60° C. While refluxing and stirring, 37 grams of isoamyl isocyanate are then slowly added dropwise, the reaction mixture is then heated for 6 hours at 50–55° C., and the acetone is completely evaporated. The residue is dissolved in water, and the solution is treated with animal charcoal and acidified with dilute hydrochloric acid. The precipitated N-4-methyl-benzenesulphonyl-N'-isoamyl-urea is filtered off with suction, reprecipitated from dilute ammonia solution and from dilute hydrochloric acid as described in Example 19, and recrystallised from 1.2 litres of ethanol of 50 percent strength. Yield: 60 grams (70% of theory). It melts at 142–144° C.

N-4-methyl-benzenesulphonyl-N'-n-amyl-urea prepared in analogous manner melts at 103–105° C.

*Example 22.—N-4-methyl-benzenesulphonyl-N'-cyclopentyl-urea*

49.3 grams (0.25 mol) of 4-methyl-benzenesulphonyl-isocyanate are dissolved in 250 cc. of absolute benzene, and 21.3 grams (0.25 mol) of cyclopentylamine are slowly added dropwise, while stirring, at 20° C. The mixture is stirred until the smell of isocyanate has disappeared, cooled, and the N-4-methyl-benzenesulphonyl-N'-cyclopentyl-urea, which has precipitated in a good yield, is filtered off with suction. To purify it, it is dissolved in dilute ammonia, the solution is clarified with animal charcoal, and the compound is reprecipitated with dilute acid. After recrystallisation from acetonitrile the compound melts at 169–170° C.

*Example 23. — N-4-methyl-benzenesulphonyl-N'-heptyl-(4)-urea*

By the procedure described in Example 22, there is obtained from 39.5 grams (0.2 mol) of 4-methyl-benzenesulphonyl-isocyanate and 23 grams (0.2 mol) of 4-heptyl-amine a good yield of N-4-methyl-benzenesulphonyl-N'-heptyl-(4)-urea melting at 147–149° C. (after recrystallization from acetonitrile).

*Example 24. — N-4-methyl-benzenesulphonyl-N'-cyclohexylmethyl-urea*

49.3 grams of 4-methyl-benzenesulphonyl isocyanate are slowly added dropwise, while cooling and stirring vigorously, to a solution of 28.3 grams (0.25 mol) of cyclohexylmethylamine in 200 cc. of absolute benzene, and the mixture is then refluxed for 1 hour, cooled, diluted with ether, and the precipitate is filtered off with suction. A good yield of N-4-methyl-benzenesulphonyl-N'-cyclohexylmethyl-urea is obtained. It is dissolved in dilute ammonia solution. The solution is clarified with charcoal and acidified with dilute hydrochloric acid, while stirring vigorously. The precipitate is filtered off with suction, thoroughly washed with water, and recrystallised from acetonitrile. It melts at 178–179° C.

*Example 25. — N-4-methyl-benzenesulphonyl-N'-n-hexyl-urea*

40 grams of 4-methyl-benzenesulphonyl isocyanate are dissolved in 150 cc. of absolute benzene. While stirring continuously, 21 grams of 1-amino-n-hexane are slowly added dropwise, the temperature rising to about 55° C. The solution is then heated for 3 hours at 60–70° C. and evaporated under reduced pressure. The residue is treated with dilute ammonia solution (1:10), any undissolved matter is filtered off, the filtrate is filtered with suction through a layer of charcoal, and acidified with 2 N-hydrochloric acid. The precipitate is dissolved in dilute ammonia solution (1:25), filtered, again treated with charcoal and slowly acidified with 2 N-hydrochloric acid. A good yield of crystalline N-4-methylbenzenesulphonyl-N'-n-hexyl-urea is obtained which, after recrystallisation from methanol of 50 percent strength, melts at 120–122° C.

*Example 26.—N - (3 - methyl - benzene - sulphonyl) - N'-hexyl-urea*

17.1 grams of 3-methyl-benzenesulphamide are suspended in 35 cc. of acetone and mixed, while stirring, with 70 cc. of a dilute sodium hydroxide solution containing 4 grams of caustic soda. The clear solution is cooled to 10–15° C. and 12.7 grams of n-hexylisocyanate are added dropwise. Stirring is continued for a further 30 minutes, the reaction mixture is clarified with carbon and acidified with dilute hydrochloric acid. The N-(3-methyl-benzenesulphonyl)-N'-hexylurea which is at first pasty slowly becomes crystalline. It is filtered off with suction, dissolved in dilute ammonia with moderate heating to purify it, filtered and reprecipitated by acidification with acetic acid. The crude urea is recrystallized from ethyl acetate. The substance melts at 83–85° C.

*Example 27.—N - (4 - isopropyl - benzenesulphonyl) -N'-hexyl-urea*

In the manner described in Example 26 a good yield of N-(4-isopropyl-benzenesulphonyl)-N'-hexylurea is obtained from 25 grams of 4-isopropyl-benzenesulfamide and 16 grams of n-hexylisocyanate. The substance melts at 95–97° C. after recrystallization from di-isopropylether.

*Example 28.—N - (3 - isopropyl - benzenesulphonyl)-N'-hexyl-urea*

4 grams of aminocumene are sulphurized by heating with sulphuric acid in 1.2-dichlorobenzene. The amino-sulphonic acid obtained is diazotized and the diazonium-salt is deaminated with hypophosphorous acid to yield 3-isopropyl-benzene sulphonic acid. The sodium salt of this compound together with phosphorous pentachloride yields the 3-isopropyl-benzene-sulphonic acid chloride which is reacted with ammonia to form the 3-isopropyl-benzenesulphamide melting at 74–75° C.

19.9 grams of 3-isopropyl-benzene sulphamide are dissolved in 40 cc. of acetone and mixed with 80 cc. of an aqueous sodium hydroxide solution containing 4 grams of caustic soda. To the clear solution obtained are added dropwise, while stirring, 12.7 grams of n-hexyl-isocyanate and stirring is continued for a further 30 minutes. The solution is clarified with animal charcoal and acidified with hydrochloric acid. A crystalline precipitate of N-(3-isopropylbenzene-sulphonyl)-N'-hexyl urea is obtained which is filtered off with suction and recrystallized from ethyl acetate. The urea is obtained in a good yield and melts at 110–111° C.

*Example 29.—N - (4 - isopropyl - benzene-sulphonyl)-N'-propyl-urea*

25.7 grams of 4-isopropyl-benzenesulphonyl-carbamic acid methyl ester (melting point: 99–101° C.; prepared from isopropyl-benzenesulphamide and chlorocarbonic acid methyl ester in acetonic solution in the presence of potassium carbonate) are mixed in a round flask with 5.9 grams of propylamine. The mixture is heated on an oil bath for about 1 hour to 120–130° C., the methyl alcohol formed during the reaction being removed in vacuo. The viscous mass obtained is dissolved in hot ethyl acetate and then allowed to cool. A good yield of crystalline N-(4-isopropyl-benzenesulphonyl)-N'-propyl-urea is obtained. After drying the substance melts at 135–137° C.

*Example 30. — N-(2.4-dimethyl-benzenesulphonyl)-N'-cyclohexyl-urea*

29.5 grams of 2.4-dimethyl-benzene-sulphamide are suspended in 60 cc. of acetone, and a solution of 7 grams of sodium hydroxide in 120 cc. of water is added to the suspension. At about 15° C., 21.6 grams of cyclohexyl isocyanate are added dropwise, while stirring, to the solution of the sodium salt of 2.4-dimethyl-benzenesulphonamide, any temporary precipitation being disregarded. A small amount of precipitate is filtered off, and the filtrate is clarified with animal charcoal and acidified with dilute hydrochloric acid while stirring. A crystalline precipitate is obtained which is filtered off with suction, taken up in 600 cc. of dilute ammonia solution (1 part by volume of concentrated ammonia to 20 parts by volume of water), and the undissolved matter is filtered off. Acidification of the filtrate with dilute hydrochloric acid produces a good yield of N-(2.4-dimethyl-benzenesulphonyl)-N'-cyclohexyl-urea which is filtered off with suction and recrystallised from ethanol. The product melts at 183–185° C.

*Example 31.—N - (3.4 - dimethoxy - benzenesulphonyl)-N'-isobutyl-urea*

27 grams of 3.4-dimethoxy-benzene-sulphamide are suspended in 41 cc. of acetone, and dissolved with 82 cc. of a solution of 5 grams of sodium hydroxide. 12.4 grams of isobutyl isocyanate are slowly added dropwise at about 15° C., the reaction mixture is stirred for ½ hour, a small amount of precipitate is filtered off and the solution is lowly acidified with dilute hydrochloric acid, while stirring. A precipitate is obtained which is purified by dissolution in dilute ammonia solution, and acidification with hydrochloric acid as described in Example 30. A good yield of N-3.4-dimethoxy-benzenesulphonyl)-N'-isobutyl-urea is obtained; after recrystallization from ethanol it melts at 196° C.

By reacting 3.4-dimethoxy-benzenesulphonamide with n-hexyl isocyanate in an analogous manner N-(3.4-dimethoxy-benzenesulphonyl)-N'-n-hexyl-urea melting at 176–177° C. is obtained.

*Example 32.—N - (4 - methoxy - 3 - methyl - benzenesulphonyl)-N'-cyclohexylmethyl-urea*

50 grams of 4-methoxy-3-methyl-benzenesulphonyl-ethyl-urethane (prepared from 4 - methoxy - 3 - methyl-benzenesulphamide by reaction with ethyl chloroformate in the presence of dry and ground potassium carbonate) and 21 grams of cyclohexyl-methyl amine are heated for 16 hours to 110° C. in 100 cc. of glycol monomethyl ether. The solvent used is distilled off under reduced pressure and the semi-solid residue is digested for some time in the hot with dilute ammonia. It is then suction-filtered and the aqueous solution is acidified with hydrochloric acid. The precipitate is suction-filtered and dissolved in dilute ammonia for purification. The solution is clarified with carbon and re-acidified with hydrochloric acid. The N-(4-methoxy-3-methyl-benzenesulphonyl)-N'-cyclohexylmethyl-urea obtained in a good yield is filtered off with suction and washed well with water. The substance melts at 164° C. after having been recrystallized from aceto-nitrile.

*Example 33.—N - (4 - methyl - benzenesulphonyl) - N'-ethyl-urea*

60 grams of 4-methyl-benzenesulphonyl-isocyanate are dissolved in 250 cc. of absolute benzene and dry ethylamine is introduced into the solution for 1 hour while stirring at 40° C. under a nitrogen atmosphere. The temperature rises to 85° C. and rapid reaction occurs. The reaction mixture is then boiled for a further 3 hours and concentrated as far as possible in vacuo, the residue is dissolved in water and the aqueous solution is extracted twice with ether. The aqueous phase is clarified with animal charcoal and slowly acidified with 2 N-hydrochloric acid. The precipitate is suction-filtered, washed with water and recrystallized from 300 cc. of ethanol of 50% strength. The N-(4-methyl-benzenesulphonyl)-N'-ethyl-urea is obtained in a very good yield. It melts at 141–142.5° C.

*Example 34.—N - (4 - ethyl - benzenesulphonyl) - N' - hexyl-urea*

15 grams of 4-ethyl-benzenesulphamide are dissolved in a mixture of 108 cc. of acetone and 108 cc. of a 0.5 N-sodium hydroxide solution. To the solution so obtained there is added dropwise at 5–10° C., while stirring, within 10 mnutes, a solution of 7 grams of n-hexyl-isocyanate in 20 cc. of acetone. Stirring is continued for a further 20 minutes, the whole is diluted with 300 cc. of water and the undissolved matter is filtered off. The turbid filtrate is extracted twice by shaking with ether, clarified with carbon and acidified with dilute hydrochloric acid. The precipitate is taken up in a mixture of 120 cc. of dilute ammonia (1:25) and 1400 cc. of water, the undissolved matter is filtered off and the filtrate re-acidified with dilute hydrochloric acid. The product obtained after suction filtration and washing with water is dried, recrystallized from 60 cc. of ethyl acetate. It is the N-(4-ethyl-benzene-sulphonyl)-N'-hexyl-urea which melts at 110–112° C.

By dissolving the N-(4-ethyl-benzenesulphonyl)-N'-hexyl-urea in an equivalent amount of dilute ammonia (1:25) a very readily crystalizing ammonium salt is obtained which is only difficultly soluble in cold water.

*Example 35.—N - (4 - methyl - benzenesulphonyl) - N' - [2.4-dimethyl-pentyl-(3)]-urea*

30 grams of 2.4-dimethyl-pentylamine-(3) are added dropwise to a solution of 50 grams of para-toluene-sulphonyl-isocyanate in 200 cc. of benzene and the reaction mixture is refluxed for 3 hours. The solvent is distilled off and the solid residue is dissolved in dilute sodium hydroxide solution. The solution is clarified with carbon, the filtrate is acidified with hydrochloric acid and the precipitate is suction-filtered. To purify the product, it is dissolved in dilute ammonia, the solution is clarified with carbon and cautiously acidified with hydrochloric acid. The N-(4-methyl-benzenesulphonyl)-N'-[2.4-dimethyl-pentyl-(3)]-urea obtained in a good yield is filtered off with suction, washed well with water, dried and recrystallized from a mixture of acetic acid methyl ester and di-isopropyl-ether. The product melts at 151–152° C.

*Example 36.—N - (4 - cyclohexyl - benzenesulphonyl) - N'-isobutyl-urea*

48 grams of 4-cyclohexyl-benzenesulphamide (J. Am. Chem. Soc., 63, 3447, 1941 are dissolved while hot in a mixture of 210 cc. of N 1-sodium hydroxide solution, 500 cc. of water and 800 cc. of acetone. The reaction mixture is cooled and 36 grams of isobutyl-isocyanate are added dropwise while stirring at 10° C. regardless of a small separation of the sodium salt of the sulphamide. Stirring is continued for a further 3 hours, the acetone is distilled off and the mixture acidified with dilute acetic acid. A precipitate is obtained which is extracted in the hot with dilute ammonia. The solution which has been filtered is acidified with hydrochloric acid and the N-(4-cyclohexyl-benzenesulphonyl)-N'-isobutyl-urea obtained is recrystallized from a mixture of acetonitrile and di-isopropyl ether. The substance melts at 167–168° C.

*Example 37.—N - (4 - n - butoxy - benzenesulphonyl) - N'-butyl-(1)-urea*

17 grams of n-butyl-isocyanate are slowly added dropwise at 0° C., while stirring, to a solution of 35 grams of 4-n-butoxy-benzenesulphamide in 150 cc. of 1 N-sodium hydroxide solution and 300 cc. of acetone, and the reaction mixture is then stirred for a further 30 minutes at 0° C. The reaction mixture is then diluted with 700 cc. of water and half the solvent is distilled off. The solution is clarified with carbon and acidified with hydrochloric acid. The precipitate is filtered off with suction, washed well with water and then dissolved in the hot in a 5% aqueous solution of sodium bicarbonate for purification. The solution is cooled to 40° C., clarified with carbon and added dropwise, while stirring, to an excess of dilute hydrochloric acid of 60° C. The N-(4-n-butoxy-benzenesulphonyl)-N'-butyl-(1) urea obtained in a good yield is suction-filtered, washed well with water, dried and then recrystallized from aceto-nitrile. Melting point: 127° C.

*Example 38.—N-(4-methyl-benzenesulphonyl)-N'-n-octyl-urea*

23 grams of N-4-methyl-benzenesulphonyl-carbamic acid methyl ester and 13 grams of n-octylamine are mixed and then heated for 45 minutes at 120–130° C. After cooling, a brown clear resin is obtained which is recrystallized from 280 cc. of ethanol of 80% strength. In this manner the N-(4-methyl-benzenesulphonyl)-N'-n-octyl-urea is obtained in the form of white needles which melt at 101–103° C.

In analogous manner there is obtained by reacting N-4-methyl-benzenesulphonyl-carbamic acid methyl ester with n-heptylamine, the N-(4-methyl-benzenesulphonyl)-N'-n-heptyl-urea melting at 112–114° C.

*Example 39.—N-(4-n-butyl-benzenesulphonyl)-N'-isobutyl urea*

13.1 grams of 4-n-butyl-benzenesulphamide (prepared by reacting at —5° C. n-butylbenzene with an excess of chlorosulphonic acid in absolute chloroform and then aminating the isolated 4-n-butyl-benzenesulphonic acid chloride with an excess of solid ammonium carbonate; melting point: 94–96° C.), 18.3 grams of ground potassium carbonate and 130 cc. of acetone are stirred for 1 hour at 55° C. To the mixture so obtained is then added within 30 minutes, while stirring, the solution of 6.7 grams of isobutyl isocyanate in 10 cc. of acetone and stirring is continued for a further 7 hours at 55° C. The residue retained after evaporation of the acetone is dissolved in about 18 litres of water, the solution is adjusted to a pH value of 9 by addition of 2 N-hydrochloric acid, then clarified with carbon and acidified with hydrochloric acid to obtain a pH of 3. The resinous substance which precipitates is separated from the mother liquor, washed with water and recrystallized from 100 cc. of ethanol of 65% strength. In this manner there is obtained a good yield of the N-(4-n-butyl-benzenesulphonyl)-N'-isobutyl-urea melting at 90–93° C.

In analogous manner there is obtained by reaction of 4-n-hexyl-benzenesulphamide (prepared by reaction of n-hexylbenzene with an excess of chlorosulphonic acid and absolute chloroform at —5° C. and subsequent amination of the isolated 4-n-hexyl-benzene-sulphonic acid chloride with an excess of solid ammonium carbonate; melting point: 85–86° C.; cf. J. Am. Chem. Soc. 63 (1941), page 3447) with isobutyl-isocyanate using anhydrous potassium carbonate and acetone, the N-(4-n-hexyl-benzenesulphonyl)-N'-isobutyl-urea melting at 92–95° C.

*Example 40.—N-(4-pentyl-(3)-benzenesulphonyl)-N'-isobutyl-urea*

9.6 grams of 4-pentyl-(3)-benzenesulphamide (prepared by reaction of 3-phenyl-pentane with an excess of chlorosulphonic acid in absolute chloroform at —5° C. and subsequent amination of the isolated 4-pentyl-(3)-benzenesulphonic acid chloride with an excess of solid ammonium carbonate; melting point: 71–74° C.), 13 grams of ground potassium carbonate and 70 cc. of acetone are stirred for 1 hour at 55° C. and to the mixture obtained is subsequently added dropwise within 30 minutes, while stirring, a solution of 4.6 grams of isobutyl isocyanate in 17 cc. of acetone. The mixture is heated at the boil for a further 7½ hours, the acetone is evaporated as completely as possible under reduced pressure and the residue is dissolved by the addition of 500 cc. of water. The solution is suction-filtered through a carbon layer and the clear filtrate is acidified with 2 N-hydrochloric acid. The precipitate is filtered off with suction, washed with water and recrystallized from 100 cc. of ethanol of 60% strength. N-(4-pentyl-(3)-benzene-sulphonyl)-N'-isobutyl-urea is obtained in a good yield. The substance melts at 115–117° C.

In analogous manner there is obtained by reacting 4-pentyl-(3)-benzenesulphamide with cyclohexyl-isocyanate in the presence of potassium carbonate and acetone, N-(4-pentyl-(3)-benzenesulphonyl)-N'-cyclohexyl-urea. After recrystallization from ethanol of 70% strength, it melts at 133–135° C.

We claim:
1. The compounds of the group consisting of (1) benzenesulphonylureas of the formula

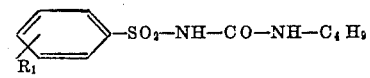

wherein $R_1$ represents an alkyl group having at most 6 carbon atoms, and (2) pharmaceutically acceptable basic salts thereof.

2. The compounds of the formula

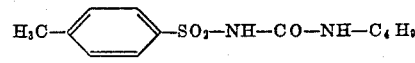

3. The compound of the formula

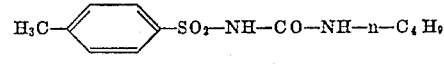

4. The compound of the formula

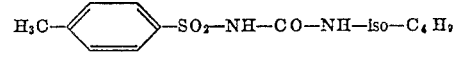

5. The compound of the formula

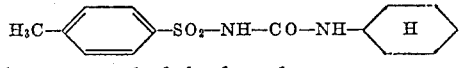

6. The compound of the formula

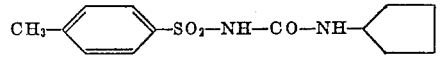

7. A compound of the group consisting of (1) benzenesulphonylureas of the formula

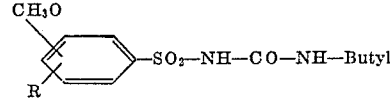

wherein R is a member of the group consisting of hydrogen and methoxy, and (2) pharmaceutically acceptable basic salts thereof.

8. N-benzenesulphonyl-N'-cyclohexylurea.

9. A tablet suitable for oral administration and the lowering of blood sugar in the treatment of diabetes containing about 0.5 gram of a sulphonylurea of the formula:

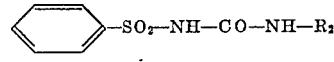

wherein $R_2$ is alkyl of 2 to 8 carbon atoms, and a pharmaceutical diluent.

10. A tablet suitable for oral administration and the lowering of blood sugar in the treatment of diabetes containing about 0.5 gram of a sulphonylurea of the formula:

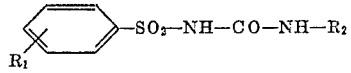

wherein $R_1$ is alkyl having at most 6 carbon atoms and $R_2$ is alkyl of 2 to 8 carbon atoms, and a pharmaceutical diluent.

11. A tablet suitable for oral administration and the lowering of blood sugar in the treatment of diabetes containing about 0.5 gram of a sulphonylurea of the formula:

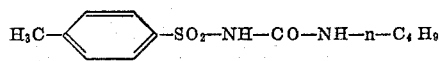

and a pharmaceutical diluent.

12. The sodium salt of the compound of the formula:

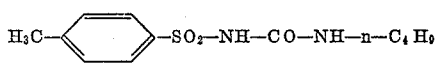

13. A tablet suitable for oral administration and the lowering of blood sugar in the treatment of diabetes containing about 0.5 gram of a compound selected from the group consisting of (1) sulphonylureas of the formula:

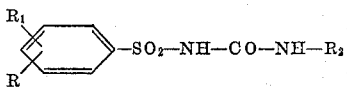

wherein R is selected from the group consisting of hydrogen, and alkyl and alkoxy having at most six carbon atoms, $R_1$ is selected from the group consisting of hydrogen, cyclohexyl and alkyl and alkoxy having at most six carbon atoms and $R_2$ is selected from the group consisting of alkyl, alkenyl, cycloalkyl and cycloalkylalkyl of two to eight carbon atoms and (2) pharmaceutically acceptable basic salts thereof, and a pharmaceutical diluent.

14. A process for the lowering of blood sugar in the treatment of diabetes which comprises orally administering an effective amount of a composition having as the essential active ingredient a compound selected from the group consisting of (1) sulphonylureas of the formula:

wherein R is selected from the group consisting of hydrogen, and alkyl and alkoxy having at most six carbon atoms, $R_1$ is selected from the group consisting of hydrogen, cyclohexyl and alkyl and alkoxy having at most six carbon atoms, and $R_2$ is selected from the group consisting of alkyl, alkenyl, cycloalkyl and cycloalkylalkyl of two to eight carbon atoms and (2) pharmaceutically acceptable basic salts thereof.

15. A process for the lowering of blood sugar in the treatment of diabetes which comprises orally administering an effective amount of a composition having as the essential active ingredient N-4-methyl-benzenesulphonyl-N'-n-butyl-urea.

References Cited in the file of this patent

FOREIGN PATENTS

| | | |
|---|---|---|
| 61,524 | Denmark | Nov. 8, 1943 |
| 919,464 | France | Nov. 25, 1946 |
| 993,465 | France | July 25, 1951 |
| 71,236 | Norway | Nov. 4, 1946 |

OTHER REFERENCES

Petersen: "Chem. Ber.," vol. 83 (1950), pp. 551–557.